(12) United States Patent
Zhao et al.

(10) Patent No.: US 9,214,031 B2
(45) Date of Patent: Dec. 15, 2015

(54) MOTION DETECTION METHOD AND ASSOCIATED APPARATUS

(75) Inventors: Shao-Hai Zhao, Jiangsu (CN); Run-Liang Shi, Jiangsu (CN)

(73) Assignee: SERNET (SUZHOU) TECHNOLOGIES CORPORATION, Jiangsu (CN)

( * ) Notice: Subject to any disclaimer, the term of this patent is extended or adjusted under 35 U.S.C. 154(b) by 348 days.

(21) Appl. No.: 13/552,982

(22) Filed: Jul. 19, 2012

(65) Prior Publication Data

US 2013/0064295 A1 Mar. 14, 2013

(30) Foreign Application Priority Data

Sep. 9, 2011 (CN) .......................... 2011 1 0266954

(51) Int. Cl.
H04N 7/26 (2006.01)
G06T 7/20 (2006.01)
H04N 5/14 (2006.01)
H04N 5/21 (2006.01)

(52) U.S. Cl.
CPC .............. *G06T 7/2053* (2013.01); *H04N 5/144* (2013.01); *G06T 2207/10016* (2013.01); *G06T 2207/20144* (2013.01); *H04N 5/21* (2013.01)

(58) Field of Classification Search
USPC ....................................................... 375/240
See application file for complete search history.

(56) References Cited

U.S. PATENT DOCUMENTS

| | | | | |
|---|---|---|---|---|
| 5,543,939 A * | 8/1996 | Harvey et al. | ............. | 375/240.02 |
| 5,796,445 A * | 8/1998 | Nomura et al. | ............... | 348/607 |
| 6,593,956 B1 * | 7/2003 | Potts et al. | ................. | 348/14.09 |
| 8,134,614 B2 * | 3/2012 | Fujii | .............................. | 348/239 |
| 8,437,503 B2 * | 5/2013 | Verdant | ........................ | 382/103 |
| 2004/0017517 A1 * | 1/2004 | Alvarez | ........................ | 348/700 |
| 2004/0146112 A1 * | 7/2004 | Park | .......................... | 375/240.25 |
| 2005/0168653 A1 * | 8/2005 | Wyman | ........................ | 348/700 |
| 2007/0286499 A1 * | 12/2007 | Freiburg et al. | ............... | 382/229 |
| 2008/0106642 A1 * | 5/2008 | Srinivasan et al. | ............ | 348/452 |
| 2008/0292201 A1 * | 11/2008 | Dumitras | ........... | G06K 9/00234 382/260 |
| 2009/0073558 A1 * | 3/2009 | Jacobs | ................. | G02B 27/017 359/464 |
| 2009/0128652 A1 * | 5/2009 | Fujii | .......................... | 348/222.1 |
| 2010/0026470 A1 * | 2/2010 | Wilson et al. | .............. | 340/10.52 |
| 2010/0188571 A1 * | 7/2010 | Wei Yin | ........................ | 348/453 |
| 2010/0277586 A1 | 11/2010 | Ying et al. | | |
| 2011/0211732 A1 * | 9/2011 | Rapaport | ....................... | 382/107 |

(Continued)

FOREIGN PATENT DOCUMENTS

| | | |
|---|---|---|
| CN | 101221663 A | 7/2008 |
| CN | 101465955 A | 6/2009 |
| CN | 101510358 A | 8/2009 |

OTHER PUBLICATIONS

CPC Definition for class H04N5/217 and H04N5/225.*

(Continued)

*Primary Examiner* — Tracy Li
*Assistant Examiner* — Mohammad J Rahman
(74) *Attorney, Agent, or Firm* — McClure, Qualey & Rodack, LLP

(57) ABSTRACT

A motion detection method is provided. The method includes steps of: capturing a current frame, generating a current luma frame according to the current frame, generating a foreground binary image according to the current luma frame, a background luma image and a sensitivity, and updating the background luma frame according to an updating frequency and the sensitivity.

14 Claims, 7 Drawing Sheets

(56) References Cited

U.S. PATENT DOCUMENTS

| | | | |
|---|---|---|---|
| 2011/0254976 A1* | 10/2011 | Garten | 348/229.1 |
| 2011/0294544 A1* | 12/2011 | Liang et al. | 455/556.1 |
| 2012/0002112 A1* | 1/2012 | Huang et al. | 348/579 |
| 2012/0002899 A1* | 1/2012 | Orr et al. | 382/282 |
| 2012/0019728 A1* | 1/2012 | Moore | 348/678 |
| 2013/0033622 A1* | 2/2013 | Li | 348/241 |
| 2014/0018669 A1* | 1/2014 | Xu | 600/424 |
| 2014/0105462 A1* | 4/2014 | Ramaswamy et al. | 382/103 |

OTHER PUBLICATIONS

CN Office Action dated Jan. 23, 2015.
Full English (machine) translation of CN101221663 (Published Jul. 16, 2008).
English Abstract translation of CN101510358 (Published Aug. 19, 2009).

* cited by examiner

MOTION DETECTION METHOD AND ASSOCIATED APPARATUS

This application claims the benefit of People's Republic of China application Serial No. 201110266954.3, filed Sep. 9, 2011, the subject matter of which is incorporated herein by reference.

BACKGROUND OF THE INVENTION

1. Field of the Invention

The invention relates in general to a motion detection method and associated method, and more particularly to a motion detection method capable of performing motion detection without a motion vector and associated method.

2. Description of the Related Art

Accompanied with improvements of broadband transmission environments, high-quality video frame transmission is to become a future trend. As related hardware equipment with consumer-friendly prices gains prevalence, high-quality video services are now in higher demands. In order to efficiently and smoothly complete video frame transmissions under a limited bandwidth or capacity, video frames are necessarily compressed in a transmission process of the video frames.

Certain compression algorithms are implemented via a video encoder. In a video encoder, based on high correlations between video frames in a time-domain, a motion vector is directly placed in a macro block to be encoded according to a motion vector prediction technique to express a distance between the macro block and a most similar reference block in a reference frame. Thus, a data amount to be encoded in the encoding process can be significantly reduced. In fact, a considerable motion correlation exists between not only video frames but also neighboring macro blocks of a same video frame. Such characteristic may be employed by the video encoder for further reducing the data amount to be encoded. However, the motion detection cannot be performed in the event that the selected compression algorithm does not generate a motion vector.

SUMMARY OF THE INVENTION

The invention is directed to a motion detection method and associated apparatus capable of performing motion detection without using a motion vector.

A motion detection method is provided by the present invention. The motion detection method includes steps of: capturing a current frame, generating a current luma frame according to the current frame, generating a foreground binary image according to the current luma frame, the background luma frame and a sensitivity; and updating the background luma frame according to an updating frequency and the sensitivity.

A motion detection apparatus is further provided by the present invention. The motion detection apparatus includes a frame capturing unit, a luma generating unit, a binary image generating unit, and a background updating unit. The frame capturing unit captures a current frame. The luma generating unit outputs a current luma frame according to the current frame. The binary image generating unit generates a foreground binary image according to the current luma frame, a background luma frame and a sensitivity. The background updating unit updates the background luma frame according an updating frequency and the sensitivity.

The above and other aspects of the invention will become better understood with regard to the following detailed description of the preferred but non-limiting embodiments. The following description is made with reference to the accompanying drawings.

DETAILED DESCRIPTION OF THE INVENTION

Structural and operational principles of the present invention shall be given in the embodiments below with reference to related diagrams below.

Figure 1:
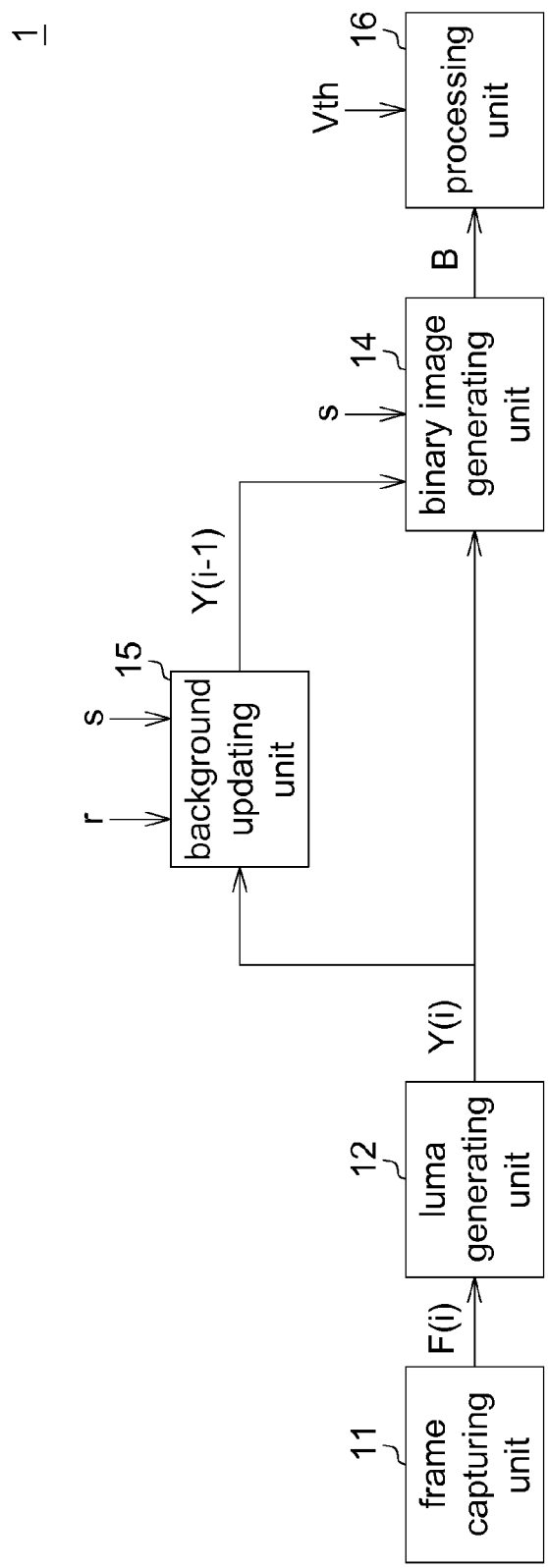
FIG. 1 is a block diagram of a motion vector apparatus according to one embodiment of the present invention.
Figure 2:
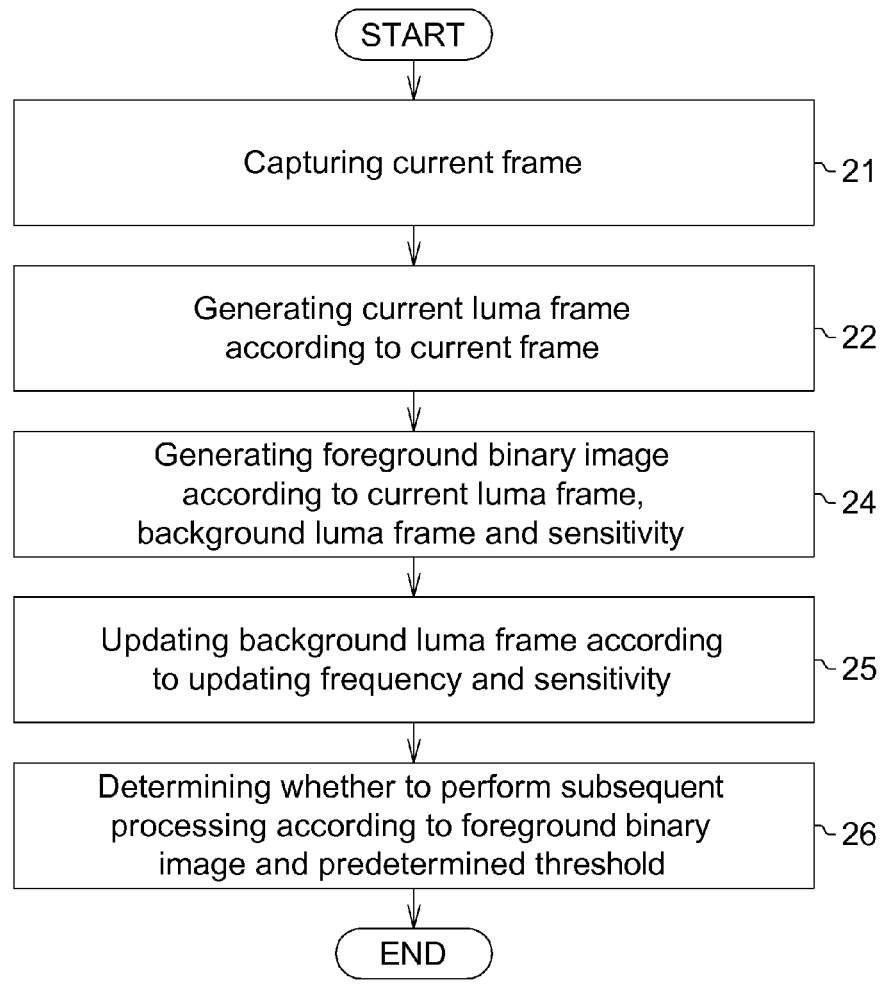
FIG. 2 is a flowchart of a motion detection method according to one embodiment of the present invention.

FIG. 1 shows a block diagram of a motion vector apparatus 1 according to one embodiment of the present invention; FIG. 2 shows a flowchart of a motion detection method according to one embodiment of the present invention. Referring to FIG. 1, a motion detection apparatus 1 includes a frame capturing unit 11, a luma generating unit 12, a binary image generating unit 14, a background updating unit 15, and a processing unit 16. For example, the luma generating unit 12, the binary image generating unit 14, the background updating unit 15 and the processing unit 16 are implemented by a processor. Referring to FIG. 2, the motion detection method includes the following steps. In Step 21, the frame capturing unit 11 captures a current frame F(i). In Step 22, the luma generating unit 12 outputs a current luma frame Y(i) according to the current frame F(i).

As shown in Step 24, the binary image generating unit 14 generates a foreground binary image B according to the current luma frame Y(i), a background luma frame Y(i-1) and a sensitivity S. The processing unit 16 obtains a size and a position of a moving object according to the foreground binary image B. In Step 25, the background updating unit 15 updates the background luma frame Y(i-1) according to an updating frequency f and the sensitivity S. In Step 26, the processing unit 16 determines whether to proceed with subsequent processing according to the foreground binary image B and a predetermined threshold Vth. Thus, through detecting the luma change, the motion detection apparatus 1 is able to perform motion detection without having to generate a motion vector, thereby significantly increasing application convenience.

For example, the foregoing updating frequency f, the sensitivity S and the predetermined threshold Vth are user-defined based on actual requirements. The updating frequency f is a reciprocal of a predetermined updating time T, which is a period for updating the background luma frame Y(i-1). By setting the updating frequency f for detecting a slow-moving object, accuracy of motion detection can be increased. When a luma difference between a current pixel of the current luma frame Y(i) and a corresponding background pixel of the background luma frame Y(i-1) is smaller than the sensitivity S, the binary image generating unit 14 sets the current pixel in foreground binary image B to 0. The current pixel set to 0 in the foreground binary image B may be regarded as a non-changing point. Conversely, when the luma difference between the current pixel in the current luma frame Y(i) and the background pixel of the background luma frame Y(i-1) is not smaller than the sensitivity, the binary image generating unit 14 sets the current pixel in the foreground binary image B to 1. The current pixel set to 1 in the foreground binary image B may be regarded as a changing point. When a ratio of the changing points in the foreground binary image B exceeds the predetermined threshold Vth, the processing unit 16 performs subsequent processing, e.g., the processing unit 16 sends out an alert signal or records the current frame F(i). Conversely, when the ratio of the changing points in the foreground binary image B does not exceed the predetermined threshold Vth, the processing 16 does not perform any subsequent processing.

Figure 3:
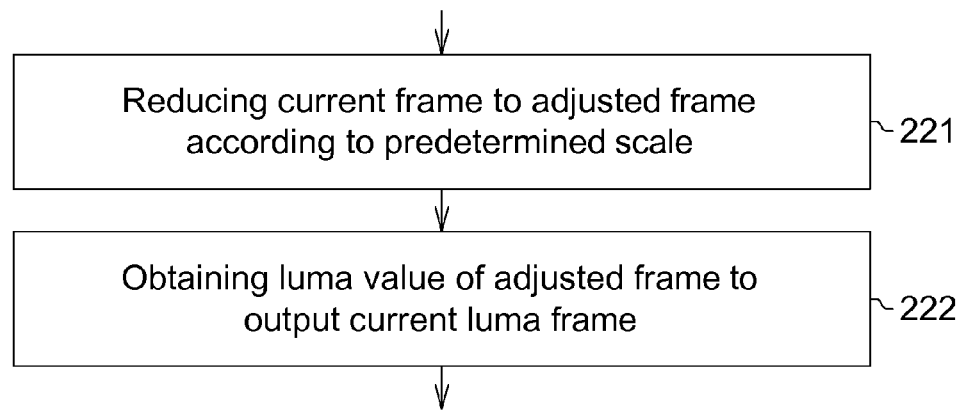
FIG. 3 is a detailed flowchart of Step 22 in FIG. 2

FIG. 3 shows a detailed flowchart of Step 22 in FIG. 2. Referring to FIGS. 1 and 3, Step 22 further comprises Steps 221 and 222. In Step 221, the luma generating unit 12 reduces the current frame F(i) to an adjusted frame according to a predetermined scale. In Step 222, the luma generating unit 12 obtains a luma value of the adjusted frame to output the current luma frame Y(i). For example, to shorten calculation time, the luma generating unit 12 reduces a 640×480 current frame F(i) to a 160×120 adjusted frame according to the predetermined scale. The image processing speed is further increased as a result.

Figure 4:
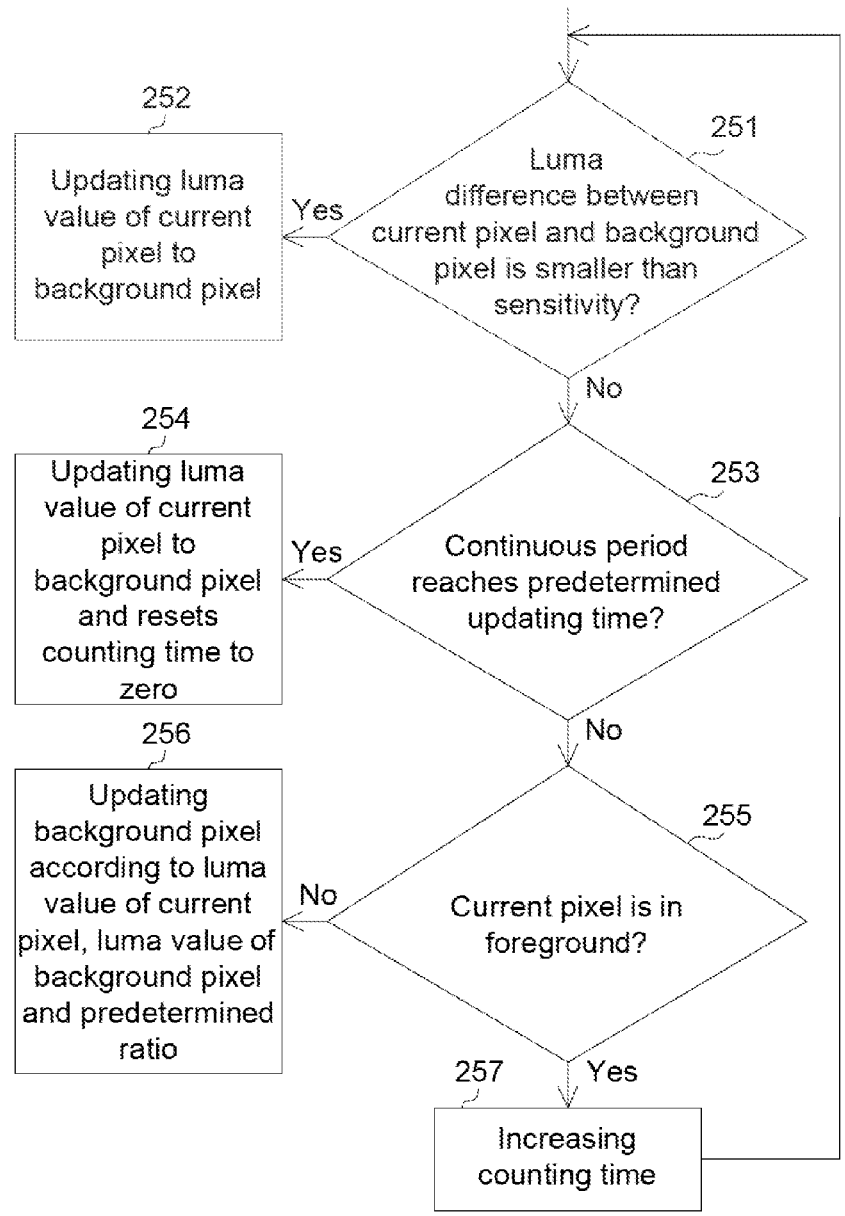
FIG. 4 is a detailed flowchart of Step 25 in FIG. 2.

FIG. 4 shows a detailed flowchart of Step 25. Referring to FIGS. 1 and 4, Step 25 further comprises Steps 251 to 257. In Step 251, the background updating unit 15 determines whether a luma difference between the current pixel in the current luma frame Y(i) and the background pixel in the background luma frame Y(i-1) is smaller than the sensitivity S, wherein the current pixel corresponds to the background pixel. In Step 252, when the luma difference is smaller than the sensitivity S, the background updating unit 15 updates the luma value of the current pixel to the background pixel. Conversely, when the luma difference is not smaller than the sensitivity, Step 253 is performed. In Step 253, the background updating unit 15 determines whether a continuous period that the luma difference being not smaller than the sensitivity S reaches the predetermined updating time T. When the continuous period that the luma difference being greater than the sensitivity S reaches the predetermined updating time T, Step 254 is performed. In Step 254, the background updating unit 15 updates the luma value of current pixel to the background pixel, and resets the counting time to 0. Conversely, when the continuous period that the luma difference being greater than the sensitivity S does not reach the predetermined updating time T, Step 255 is performed in which the background updating unit 15 determines whether the current pixel is in the foreground.

When the current pixel is not in the foreground, Step 256 is performed. In Step 256, the background updating unit 15 updates the background pixel according to the luma value of the current pixel, a luma value of the background pixel and a predetermined ratio. For example, the luma value of the current pixel and the luma value of the background pixel are respectively 100 and 20, and the predetermined ratio is 50%. Hence, the background updating unit 15 updates the luma value of the background pixel to $$\frac{100+20}{2} = 60.$$

Conversely, when the current pixel is in the foreground, Step 257 is performed. In Step 257, the background updating unit 15 increases the counting time, and Step 251 is iterated.

Figure 5:
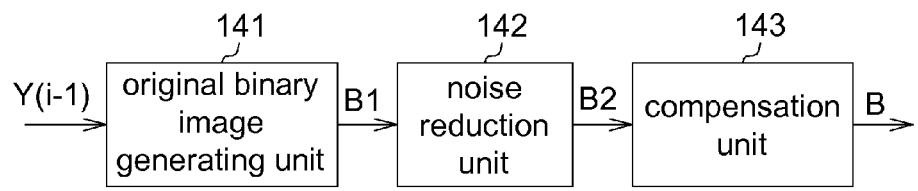
FIG. 5 is a schematic diagram of a binary image generating unit.
Figure 6:
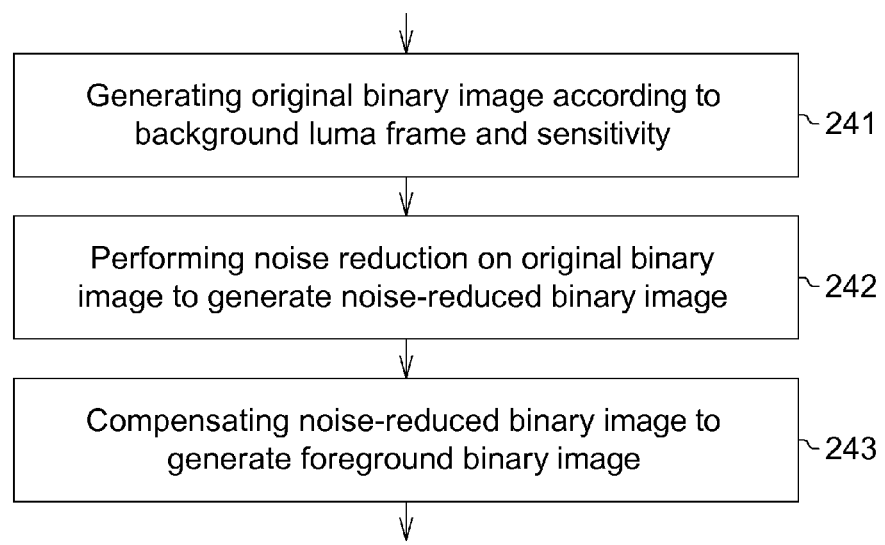
FIG. 6 is a detailed flowchart of Step 24 in FIG. 2.
Figure 7:
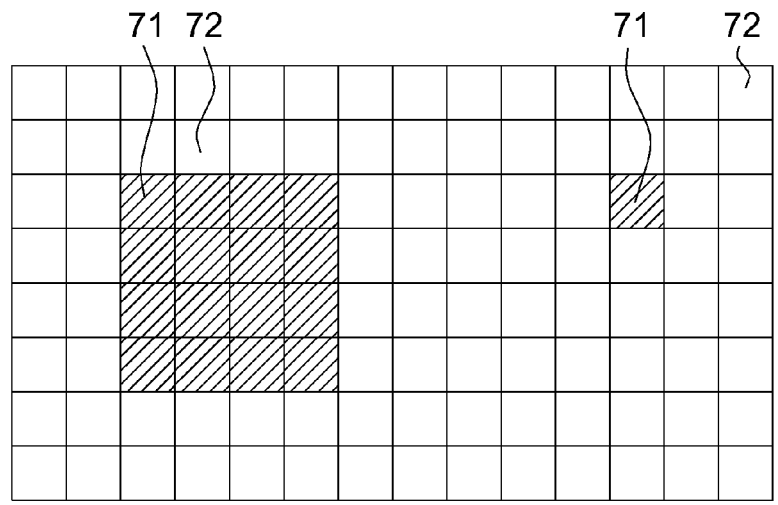
FIG. 7 is a schematic diagram of an original binary image.
Figure 8:
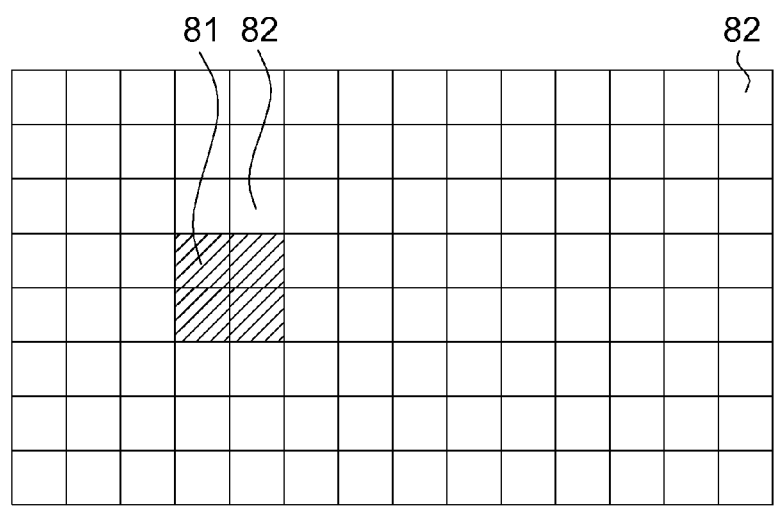
FIG. 8 is a schematic diagram of a noise-reduced binary image.
Figure 9:
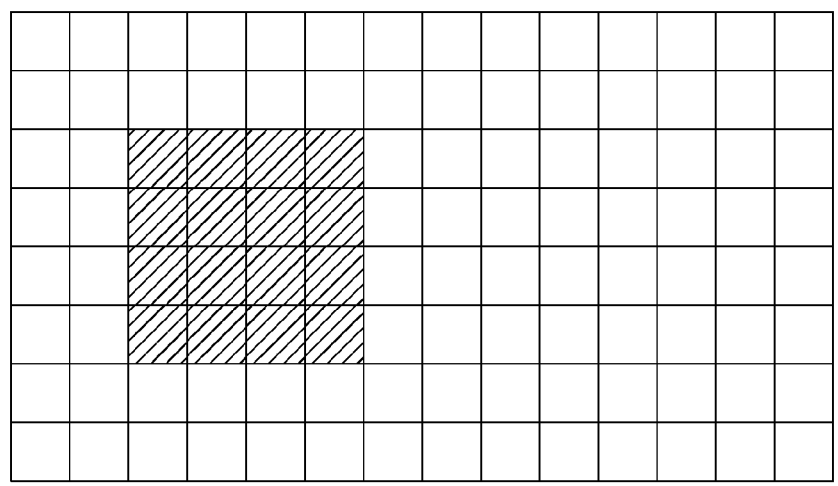
FIG. 9 is a foreground binary image.

FIG. 5 shows a schematic diagram of a binary image generating unit. FIG. 6 shows a detailed flowchart of Step 24. FIG. 7 shows a schematic diagram of an original binary image. FIG. 8 shows a schematic diagram of a noise-reduced binary image. FIG. 9 shows a foreground binary image. Referring to FIGS. 1, 5, 6, 7, 8 and 9, the foregoing binary image generating unit 14 further comprises an original binary image generating unit 141, a noise reduction unit 142 and a compensation unit 143. Step 24 further comprises Steps 241 to 243. In Step 241, the original binary image generating unit 141 generates an original binary image B1 according to the background luma frame Y(i-1) and the sensitivity S. The original binary image B1 contains original changing points 71 and original non-changing points 72. In Step 242, the noise reduction unit 142 sets the original changing points 71 neighboring to the original non-changing points 72 in the original binary image B1 to 0 to generate a noise-reduced binary image B2. The noise-reduced binary image B2 contains noise-reduced changing points and noise-reduced non-changing points 82. In Step 243, the compensation unit 143 sets the noise-reduced non-changing points 82 neighboring to the noise-reduced changing points 81 in the noise-reduced binary image 82 to 1 to generate the foreground binary image B.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A motion detection method, comprising:
    capturing a current frame;
    generating a current luma frame according to the current frame;
    generating a foreground binary image according to the current luma frame, a background luma frame and a sensitivity; and
    updating the background luma frame according to an updating frequency and the sensitivity;
    wherein the step of generating the foreground binary image comprises:
    generating an original binary image according to the background luma frame and the sensitivity, the original binary image comprising a plurality of original changing points with a first binary value and a plurality of original non-changing points with a second binary value;
    setting the original changing points neighboring to the original non-changing points to the second binary value to generate a noise-reduced binary image, the noise-reduced binary image comprising a plurality of noise-reduced changing points with the first binary value and a plurality of noise-reduced non-changing points with the second binary value; and
    setting the noise-reduced non-changing points neighboring to the noise-reduced changing points to the first binary value to generate the foreground binary image.

2. The motion detection method according to claim 1, wherein the step of generating the current luma frame comprises:
    reducing the current frame to an adjusted frame according to a predetermined scale; and obtaining a luma value of the adjusted frame to output the current luma frame.

3. The motion detection method according to claim 1, wherein the step of updating the background luma frame comprises:
   determining whether a luma difference between a current pixel in the current luma frame and a background pixel in the background luma frame is smaller than the sensitivity, the current pixel corresponding to the background pixel; and
   updating the luma value of the current pixel to the background pixel when the luma difference is smaller than the sensitivity.

4. The motion detection method according to claim 3, wherein the step of updating the background luma frame further comprises:
   determining whether a continuous period of the luma difference being not smaller than the sensitivity reaches a predetermined updating time when the luma difference is not smaller than the sensitivity; and
   updating the luma value of the current pixel to the background pixel when the continuous period of the luma difference being not smaller than the sensitivity reaches the predetermined updating time.

5. The motion detection method according to claim 3, wherein the step of updating the background luma frame further comprises:
   determining whether the current pixel is in a foreground when a continuous period of the luma difference being not smaller than the sensitivity does not reach a predetermined updating time; and
   updating the background pixel according to the luma value of the current pixel, a luma value of the background pixel and a predetermined ratio when the current pixel is not in the foreground.

6. The motion detection method according to claim 1, wherein the current luma frame outputted for a first time is predetermined as the background luma frame.

7. The motion detection method according to claim 1, further comprising:
   determining whether a subsequent processing is to be performed according to the foreground binary image and a predetermined threshold.

8. A motion detection apparatus, comprising:
   a frame capturing unit, for capturing a current frame;
   a luma generating unit, for outputting a current luma frame according to the current frame;
   a binary image generating unit, for generating a foreground binary image according to the current luma frame, a background luma frame and a sensitivity; and
   a background updating unit, for updating the background luma frame according to an updating frequency and the sensitivity;
wherein the binary image generating unit comprises:
   an original binary image generating unit, for generating an original binary image according to the background luma frame and a sensitivity, the original binary image comprising a plurality of original changing points with a first binary value and a plurality of original non-changing points with a second binary value;
   a noise reduction unit, for setting the original changing points neighboring to the original non-changing points to the second binary value to generate a noise-reduced binary image, the noise-reduced binary image comprising a plurality of noise-reduced changing points with the first binary value and a plurality of noise-reduced non-changing points with the second binary value; and
   a compensation unit, for setting the noise-reduced non-changing points neighboring to the noise-reduced changing points to the first binary value to generate the foreground binary image.

9. The motion detection apparatus according to claim 8, wherein the luma generating unit reduces the current frame to an adjusted frame according to a predetermined scale, and obtains a luma value of the adjusted frame to output the current luma frame.

10. The motion detection apparatus according to claim 8, wherein the background updating unit updates the luma value of a current pixel in the current luma frame to a background pixel in the background luma frame when a luma difference between the current pixel and the background pixel is smaller than the sensitivity.

11. The motion detection apparatus according to claim 10, wherein the background updating unit updates the luma value of the current pixel to the background pixel when a continuous period of the luma difference being not smaller than the sensitivity reaches a predetermined updating time.

12. The motion detection apparatus according to claim 10, wherein the background updating unit updates the background pixel according to the luma value of the current pixel, a luma value of the background pixel and a predetermined ratio when a continuous period that the luma difference being not smaller than the sensitivity does not reach a predetermined updating time and the current pixel is not in a foreground.

13. The motion detection apparatus according to claim 8, wherein the current luma frame outputted for a first time is predetermined as the background luma frame.

14. The motion detection apparatus according to claim 8, further comprising:
   a processing unit, for determining whether a subsequent processing is to be performed according to the foreground binary image and a predetermined threshold.

\* \* \* \* \*